United States Patent
Lee et al.

(10) Patent No.: US 10,541,421 B2
(45) Date of Patent: Jan. 21, 2020

(54) METHOD OF PREPARING LITHIUM SECONDARY BATTERY

(71) Applicant: LG CHEM, LTD., Seoul (KR)

(72) Inventors: Jung Pil Lee, Daejeon (KR); Sang Kyun Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 144 days.

(21) Appl. No.: 15/743,749

(22) PCT Filed: Mar. 30, 2017

(86) PCT No.: PCT/KR2017/003515
§ 371 (c)(1),
(2) Date: Jan. 11, 2018

(87) PCT Pub. No.: WO2017/171448
PCT Pub. Date: Oct. 5, 2017

(65) Prior Publication Data
US 2018/0205090 A1    Jul. 19, 2018

(30) Foreign Application Priority Data
Mar. 30, 2016    (KR) .................... 10-2016-0038678

(51) Int. Cl.
*H01M 4/74*    (2006.01)
*H01M 4/13*    (2010.01)
(Continued)

(52) U.S. Cl.
CPC ............ *H01M 4/74* (2013.01); *H01M 4/13* (2013.01); *H01M 4/662* (2013.01); *H01M 4/742* (2013.01);
(Continued)

(58) Field of Classification Search
CPC ........ H01M 4/74; H01M 4/66; H01M 10/058; H01M 10/48; H01M 10/0525
See application file for complete search history.

(56) References Cited

U.S. PATENT DOCUMENTS 4,176,021 A * 11/1979 O'Sullivan ............ H01M 4/32
205/60
9,231,272 B2    1/2016 Mitsuhashi et al.
(Continued)

FOREIGN PATENT DOCUMENTS

JP    2005-149792 A    6/2005
JP    2005340152 A    12/2005
(Continued)

OTHER PUBLICATIONS

Machine Translation of: 102015037758 A, Lee et al., Feb. 27, 2015.*
(Continued)

*Primary Examiner* — Kenneth J Douyette
(74) *Attorney, Agent, or Firm* — Mintz Levin Cohn Ferris Glovsky and Popeo, P.C.; Steven M. Jensen

(57) ABSTRACT

The present invention relates to a method of preparing a lithium secondary battery which may improve productivity and performance of the lithium secondary battery by visually measuring an electrolyte solution impregnation time for an electrode active material, setting an optimum estimated electrolyte solution impregnation time of the electrolyte solution for a battery based on a measured result, and reflecting the optimum estimated electrolyte solution impregnation time in a production process.

14 Claims, 1 Drawing Sheet

(51) Int. Cl.
*H01M 10/058* (2010.01)
*H01M 10/052* (2010.01)
*H01M 10/48* (2006.01)
*H01M 4/66* (2006.01)
*H01M 10/0525* (2010.01)
*H01M 4/02* (2006.01)

(52) U.S. Cl.
CPC ....... *H01M 10/052* (2013.01); *H01M 10/058* (2013.01); *H01M 10/0525* (2013.01); *H01M 10/48* (2013.01); *H01M 2004/021* (2013.01)

(56) References Cited

U.S. PATENT DOCUMENTS

| | | | |
|---|---|---|---|
| 2007/0020515 A1* | 1/2007 | Lee | H01M 2/08 429/129 |
| 2007/0054183 A1* | 3/2007 | Kim | H01M 2/14 429/144 |
| 2008/0199777 A1 | 8/2008 | Onishi et al. | |
| 2009/0214954 A1 | 8/2009 | Onishi et al. | |
| 2012/0237821 A1 | 9/2012 | Mitsuhashi et al. | |
| 2013/0065111 A1* | 3/2013 | Kim | H01M 2/38 429/163 |
| 2013/0288117 A1 | 10/2013 | Kim et al. | |
| 2014/0037642 A1 | 2/2014 | McCaffery et al. | |
| 2015/0236335 A1* | 8/2015 | Chung | H01M 2/362 429/163 |
| 2016/0056470 A1 | 2/2016 | Yamaguchi et al. | |

FOREIGN PATENT DOCUMENTS

| | | |
|---|---|---|
| JP | 2008091065 A | 4/2008 |
| JP | 2008-251189 A | 10/2008 |
| JP | 2009004139 A | 1/2009 |
| KR | 10-2007-0072512 A | 7/2007 |
| KR | 10-0865401 B1 | 10/2008 |
| KR | 2011-0138606 A | 12/2011 |
| KR | 20120106556 A | 9/2012 |
| KR | 10-1495760 B1 | 2/2015 |
| KR | 10-2015-0037758 A | 4/2015 |
| KR | 10-2015-0041355 A | 4/2015 |
| KR | 10-2015-0126367 A | 11/2015 |
| KR | 2017003515 A2 | 12/2018 |
| WO | 2012106556 A2 | 8/2012 |

OTHER PUBLICATIONS

International Search Report, issued in PCT/KR2017/003515, dated Jul. 18, 2017.
Office Action corresponding to Japanese Patent Application No. 2018-514822, dated Apr. 1, 2019, 6 pages.
Extended European Search Report for International Application No. PCT/KR2017003515, dated Dec. 13, 2018 (9 pages).

* cited by examiner

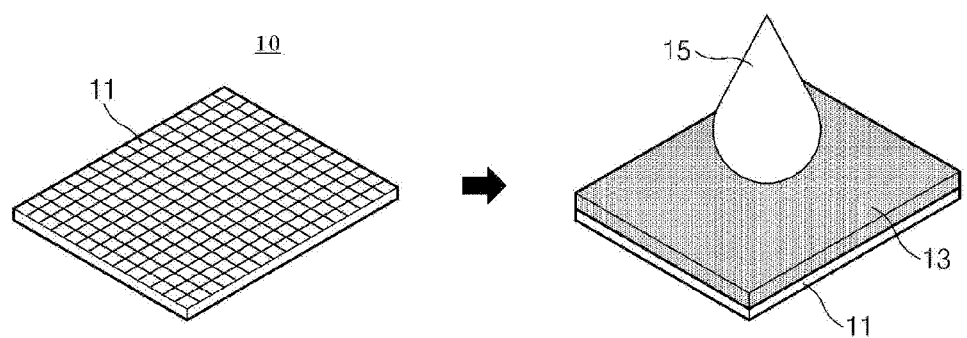

METHOD OF PREPARING LITHIUM SECONDARY BATTERY

CROSS-REFERENCE TO RELATED APPLICATIONS

This application claims the benefit of Korean Patent Application No. 10-2016-0038678, filed on Mar. 30, 2016, in the Korean Intellectual Property Office, the disclosure of which is incorporated herein in its entirety by reference.

TECHNICAL FIELD

The present invention relates to a method of preparing a lithium secondary battery, and more particularly, to a method of preparing a lithium secondary battery in which productivity and overall performance are improved by setting an optimum electrolyte solution impregnation time for an electrode and reflecting it in a production process.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Recently, the research direction of a lithium secondary battery has been toward high capacity and high output. For this purpose, it is important to allow an electrode plate to be sufficiently impregnated with an electrolyte solution in a short time during the preparation of the lithium secondary battery. In a case in which impregnability of the electrolyte solution is low, since the electrolyte solution does not reach active material particles of the electrode plate, movement of lithium ions is not only not smooth, but, accordingly, a current is also reduced. Also, if an impregnation rate of the electrolyte solution is decreased, productivity of the lithium secondary battery is reduced.

Thus, an effort to improve the impregnability of the battery is not only required, but there is also a need to maintain a system capable of mass-producing high quality batteries by excluding batteries that do not reach a certain level in advance by accurately measuring the impregnability of the prepared batteries.

Currently, as a method of evaluating the impregnability of the electrolyte solution of the lithium secondary battery, there are a method of evaluating in a formation process and a method of evaluating after the preparation of the electrode plate.

The former is a method of indirectly measuring a degree of impregnation by measuring no-load voltage (OCR) and voltage drop (IR) while performing initial charge and discharge of an already assembled bare cell. Since this method is an indirect method, accuracy is poor and the entire bare cell must be discarded when it is determined that the degree of impregnation is poor, and thus, there is a limitation in that efforts and costs of assembling the bare cell may be fruitless.

The latter includes a weight measurement method in which a weight is measured after the electrode plate is immersed in the electrolyte solution and a certain period of time has elapsed. The weight measurement method has limitations in that accuracy is poor because variation with time is extremely small, and it is difficult to quantify the variation. In particular, in this method, since the entire electrode plate prepared must also be discarded when it is determined that the degree of impregnation is poor, production costs and time are consumed, and thus, productivity may be reduced.

Thus, in order to improve yield during the preparation of the lithium secondary battery, there emerges an urgent need to set a proper electrolyte solution impregnation time before the preparation of the secondary battery, or devise evaluation criteria capable of evaluating the impregnability of the electrolyte solution which may improve accuracy while fully representing the impregnability.

PRIOR ART DOCUMENT

Korean Patent No. 10-1495760

DISCLOSURE OF THE INVENTION

Technical Problem

An aspect of the present invention provides a method of preparing a lithium secondary battery in which productivity and overall performance are improved by including a step of setting an electrolyte solution impregnation time according to electrode thickness and porosity.

Technical Solution

According to an aspect of the present invention, there is provided a method of preparing a lithium secondary battery including the steps of:

forming an electrode material mixture layer having a thickness of 10 μm to 200 μm, a porosity of 18 vol % to 30 vol %, and a density of 1 g/cc to 4.5 g/cc by coating a perforated foil with an electrode active material slurry and rolling the coated foil (S1);

preparing a non-aqueous electrolyte solution (S2);

calculating an electrolyte solution impregnation rate by measuring a time at which the non-aqueous electrolyte solution passes through the electrode material mixture layer (S3); and setting an electrolyte solution impregnation time of a measurement target full cell by using the calculated electrolyte solution impregnation rate (S4).

The perforated foil may be formed of a material selected from the group consisting of copper, aluminum, iron, tin, titanium, nickel, lead, zinc, silver, gold, stainless steel, and a combination thereof.

Also, a hole diameter of the perforated metal foil may be in a range of 0.1 μm to 1 mm, for example, 10 μm to 1 mm.

The electrode active material slurry may include an electrode active material; a solvent; and at least one additive of a binder, a conductive agent, and a filler.

The electrode active material may include a negative electrode active material or a positive electrode active material.

Specifically, in a case in which the electrode active material slurry includes the negative electrode active material, the electrode material mixture layer may have a porosity of 20 vol % to 30 vol % and a density of 1.3 g/cc to 1.8 g/cc.

Furthermore, in a case in which the electrode active material slurry includes the positive electrode active material, the electrode material mixture layer may have a porosity of 18 vol % to 30 vol % and a density of 3.4 g/cc to 4.2 g/cc.

The electrode material mixture layer may be prepared by applying a pressure of 10 MPa to 100 MPa in a temperature range of 0° C. to 120° C.

In the method, the step S3 of calculating of the electrolyte solution impregnation rate may include:

dispensing 1 μL to 10 μL of the non-aqueous electrolyte solution on a top surface of the electrode material mixture layer, and calculating the electrolyte solution impregnation rate by measuring an electrolyte solution passing time from a time of dispensing the non-aqueous electrolyte solution until a time at which the dispensed non-aqueous electrolyte solution passes through the electrode material mixture layer and appears on a bottom surface.

Also, a method of measuring the electrolyte solution passing time may be performed by visual confirmation or may be performed by indirect confirmation through a medium between an object and an observer.

Specifically, the electrolyte solution impregnation rate may be calculated using Equation 1:

Impregnation rate (μm/sec)=electrode material mixture layer thickness (μm)/time (sec) from a time of dispensing the electrolyte solution to a time of reaching a bottom surface.  [Equation 1]

Furthermore, the estimated electrolyte solution impregnation time of the measurement target full cell may be set by using Equation 2, after converting the calculated electrolyte solution impregnation rate to a rate with respect to time:

$$\text{Estimated full cell impregnation time (hr)} = \frac{0.0086(\text{mm}^{-2}) \times \text{electrode thickness }(\mu m) \times \frac{(\text{electrode area (mm}^2))}{2}}{\text{electrolyte solution impregnation rate }(\mu m/hr)}$$ [Equation 2]

wherein, in Equation 2, the estimated full cell impregnation time denotes the estimated electrolyte solution impregnation time of the full cell, and the electrode is a positive electrode or a negative electrode.

Also, after setting the electrolyte solution impregnation time of the measurement target full cell, the method of the present invention may further include the steps of:

preparing a secondary battery including the measurement target full cell (S5);

injecting the non-aqueous electrolyte solution into the secondary battery (S6); and performing an electrolyte solution impregnation process during the set time (S7).

Other objects and advantages of the present invention will be understood from the following detailed description. Further, it will be readily understood that the objects and advantages of the present invention can be realized by the means as claims and combinations thereof.

Advantageous Effects

According to a method of the present invention, processing time and costs are not only reduced by calculating an actual electrolyte solution impregnation rate for an electrode active material before an electrode preparation process, setting an optimum impregnation time of the electrolyte solution for a battery according to electrode thickness and porosity based on a measured result, and reflecting it in a production process, but the failure rate is also minimized through impregnation process improvement, and as a result, productivity and performance of the secondary battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a schematic process diagram for calculating an electrolyte solution impregnation rate in a method of preparing a lithium secondary battery according to the present invention.

DESCRIPTION OF THE SYMBOLS

10: Foil
11: Perforation
13: Electrode material mixture layer
15: Electrolyte solution

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "degree of impregnation" used in the present application refers to a degree to which an electrolyte solution penetrates into an electrode, wherein, in the present specification, as the same meaning as the expressions such as "impregnability", "absorbency", "wetting", and "absorption rate, it may be used interchangeably.

Also, the expression "secondary battery" used in the present invention denotes all secondary batteries that perform an electrochemical reaction, and examples thereof may include a lithium metal secondary battery, a lithium ion secondary battery, a lithium polymer secondary battery, or a lithium ion polymer secondary battery.

Furthermore, the expression "unit cell" used in the present application refers to a unit, in which a positive electrode, a negative electrode, and a separator disposed between the positive electrode and the negative electrode are included, and may include a structure such as a full-cell, a bi-cell, or a mono-cell.

Also, the expression "electrode assembly" used in the present application refers to only a single unit cell, or an assembled form which is formed by disposing a separator between two or more unit cells.

In general, after an electrode assembly is prepared by alternatingly stacking a positive electrode, a separator, and a negative electrode, a secondary battery is prepared by inserting the electrode assembly into a can having predetermined size and shape or a pouch-shaped case and finally injecting an electrolyte solution thereinto.

In this case, the finally injected electrolyte solution is impregnated between the positive electrode, the negative electrode, and the separator by capillary force. Thus, porosity of the cell has a significant effect on electrolyte solution impregnation. In terms of material characteristics, since the positive electrode, the negative electrode, and the separator are all hydrophobic materials but the electrolyte solution is a hydrophilic material, impregnation or wetting of the electrolyte solution into the electrode and the separator may affect the impregnation.

Until now, a method capable of setting an electrolyte solution impregnation time during the preparation of a lithium secondary battery or evaluating a degree of impregnation has not been widely known. Typically, in order to set or evaluate a degree of impregnation of an electrolyte solution, the most common method used was to evaluate the degree of impregnation after preparing a battery, injecting the electrolyte solution, and performing an impregnation process over a certain period of time. However, this method has limitations in that processing time and costs are not only increased, but productivity of the secondary battery is also reduced because the impregnation process is performed after the preparation of the battery.

Thus, the present invention aims at providing a method capable of preparing a high-quality lithium secondary battery in which productivity and performance are improved by setting an impregnation time of the electrolyte solution before the preparation of the battery.

Specifically, in an embodiment of the present invention, provided is a method of preparing a lithium secondary battery including the steps of:

forming an electrode material mixture layer having a thickness of 10 µm to 200 µm, a porosity of 18 vol % to 30 vol %, and a density of 1 g/cc to 4.5 g/cc by coating a perforated foil with an electrode active material slurry and rolling the coated foil (S1);

preparing a non-aqueous electrolyte solution (S2);

calculating an electrolyte solution impregnation rate by measuring a time at which the non-aqueous electrolyte solution passes through the electrode material mixture layer (S3); and setting an estimated electrolyte solution impregnation time of a measurement target full cell by using the calculated electrolyte solution impregnation rate (S4).

Forming Electrode Material Mixture Layer (S1)

First, the method of preparing a lithium secondary battery of the present invention may include a step of preparing an electrode material mixture layer which is used in preparing a target full cell for setting an electrolyte solution impregnation rate.

In this case, in the present invention, a perforated 11 foil 10, instead of a conventional film-shaped foil, is coated with an electrode active material slurry, and then rolled to form an electrode material mixture layer 13 (see FIG. 1).

The perforated foil may be formed of the same material as an electrode collector, and specifically, may be formed of a material selected from the group consisting of copper, aluminum, iron, tin, titanium, nickel, lead, zinc, silver, gold, stainless steel, and a combination thereof.

A thickness of the perforated metal foil may also be the same or similar to that of an electrode collector actually used, and may specifically be in a range of 3 µm to 500 µm.

That is, the metal foil may be perforated so that the electrolyte solution passing through the electrode material mixture layer may be visually observed. In this case, a diameter of a perforated hole may be in a range of 0.1 µm to 1 mm, for example, 10 µm to 1 mm.

In a case in which the diameter of the hole is 0.1 µm or less, it may be difficult to visually observe whether the electrolyte solution passes or not, and, in a case in which the diameter of the hole is greater than 1 mm, it may not be possible to coat the metal foil with the electrode material mixture layer.

Also, the electrode active material slurry in the method of the present invention may include an electrode active material; a solvent; and selectively at least one additive of a binder, a conductive agent, and a filler.

The electrode active material may include at least one negative electrode active material selected from the group consisting of a carbonaceous material; lithium-containing titanium composite oxide (LTO); metals (Me) selected from the group consisting of silicon (Si), tin (Sn), lithium (Li), zinc (Zn), magnesium (Mg), cadmium (Cd), cerium (Ce), nickel (Ni), and iron (Fe); alloys composed of the metals (Me); oxides of the metals (Me); and composites of the metals (Me) and the carbonaceous material.

Furthermore, the electrode active material may include at least one positive electrode active material selected from the group consisting of $LiCoO_2$, $LiNiO_2$, $LiMn_2O_4$, $LiCoPO_4$, $LiFePO_4$, $Li(Ni_pCo_qMn_{r1})O_2$ ($0<p<1$, $0<q<1$, $0<r1<1$, and $p+q+r1=1$), $Li(Ni_{p1}Co_{q1}Mn_{r2})O_4$ ($0<p1<2$, $0<q1<2$, $0<r2<2$, and $p1+q1+r2=2$), and $Li(Ni_{p2}Co_{q2}Mn_{r3}M_{S2})O_2$ (where M is selected from the group consisting of aluminum (Al), Fe, vanadium (V), chromium (Cr), titanium (Ti), tantalum (Ta), Mg, and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$).

Specifically, the electrode active material may include a positive electrode active material.

The electrode active material may be included in an amount of 60 wt % to 97 wt %, for example, 80 wt % to 97 wt % based on a total weight of a solid content in the electrode active material slurry.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The conductive agent is added in an amount of 1 wt % to 30 wt % based on the total weight of the solid content in the electrode active material slurry.

The binder is a component that assists in the binding between the active material and the conductive agent and in the binding with the current collector, wherein the binder is commonly added in an amount of 1 wt % to 30 wt % based on the total weight of the solid content in the electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, and various copolymers.

The solvent may include an organic solvent, such as N-methyl-2-pyrrolidone (NMP), and may be used in an amount such that desirable viscosity is obtained when the positive electrode active material as well as selectively the binder and the conductive agent is included. For example, the solvent may be included in an amount such that a concentration of the solid content in the slurry including the electrode active material as well as selectively the binder and the conductive agent is in a range of 40 wt % to 90 wt %, for example, 50 wt % to 70 wt %.

In the method according to the embodiment of the present invention, the rolling of the electrode active material slurry may be performed in a temperature range of 0° C. to 120° C. by applying a pressure of 10 MPa to 100 MPa, for example, 20 MPa to 60 MPa.

In the performing of the pressure process, in a case in which the pressure process is performed at a temperature of 0° C. or less, there are difficulties in the process, and, in a case in which the pressure process is performed at a temperature of 120° C. or more, physical properties of the components of the positive electrode may be changed.

Also, in the performing of the pressure process, in a case in which the pressure applied is 10 MPa or less, it is difficult to prepare an electrode material mixture layer having a uniform thickness, and, in a case in which the pressure applied is 100 MPa or more, an active material breakage phenomenon may occur to affect electrolyte solution impregnation rate measurement results.

Furthermore, the method of preparing a lithium secondary battery of the present invention may further include drying the prepared electrode material mixture layer, after the pressure process.

The drying may be performed by vacuum drying in a temperature range of 50° C. to 120° C. for 1 hour to 24 hours with respect to the positive electrode, and may be performed by vacuum drying in a temperature range of 60° C. to 150° C. for 2 hours to 48 hours with respect to the negative electrode.

In consideration of the actual porosity of the electrode in the present invention, an electrode material mixture layer having a porosity of 18 vol % to 30 vol % and a density of 1 g/cc to 4.5 g/cc, for example, 1.3 g/cc to 4.2 g/cc may be provided by the rolling.

In a case in which the porosity of the electrode material mixture layer is greater than 30 vol %, since the electrolyte solution impregnation rate is excessively high to increase a difference from an actual impregnation rate, reliability of an impregnation time obtained through the present experiment is low. Also, it is not easy to prepare an electrode material mixture layer having a porosity of less than 18 vol %.

The density of the electrode material mixture layer is inversely proportional to the porosity, and may vary with the porosity.

Specifically, in a case in which the electrode active material slurry includes a positive electrode active material, the electrode material mixture layer may have a porosity of 18 vol % to 30 vol % and a density of 3.4 g/cc to 4.2 g/cc.

Furthermore, in a case in which the electrode active material slurry includes a negative electrode active material, the electrode material mixture layer may have a porosity of 20 vol % to 30 vol % and a density of 1.3 g/cc to 1.8 g/cc.

In this case, in the method of the present invention, the electrode material mixture layer may be formed to a thickness of about 10 μm to 200 μm in consideration of an actual thickness of the electrode.

In a case in which the thickness of the electrode material mixture layer is greater than 200 μm, it may not only affect the impregnation rate, but a difference from the actual electrode thickness of the cell may also be increased, and thus, the reliability of the impregnation time obtained through the present experiment may be reduced. Also, it is not easy to prepare an electrode material mixture layer having a uniform thickness of less than 10 μm.

Preparing Non-Aqueous Electrolyte Solution (S2)

Subsequently, in the method of preparing a lithium secondary battery of the present invention, a non-aqueous electrolyte solution used to measure an electrolyte solution impregnation rate may be prepared.

The non-aqueous electrolyte solution is a common non-aqueous electrolyte solution used in the preparation of a secondary battery, wherein, specifically, it may include an organic solvent and selectively a lithium salt.

The organic solvent is not limited as long as it may minimize decomposition due to an oxidation reaction during charge and discharge of the secondary battery and may exhibit desired characteristics with the additive, and, for example, may include a carbonate-based compound and a propionate-based compound. These compounds may be used alone or in combination of two or more thereof.

Among the above non-aqueous organic solvents, the carbonate-based compound may include any one selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and vinylene carbonate (VC), or a mixture of two or more thereof.

Also, the propionate-based compound may include any one selected from the group consisting of ethyl propionate (EP), propyl propionate (PP), n-propyl propionate, isopropyl propionate, n-butyl propionate, isobutyl propionate, and tert-butyl propionate, or a mixture of two or more thereof.

In addition, as the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

The lithium salt included in the non-aqueous electrolyte solution of the present invention may be used without limitation so long as it is typically used in an electrolyte solution for a lithium secondary battery. For example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or in a mixture of two or more thereof, if necessary. An amount of the lithium salt may be appropriately changed within a typical usable range, but, in order to obtain an optimal effect of forming an anti-corrosion film on the surface of the electrode, the lithium salt may be included in a concentration of 0.8 M to 1.5 M in the electrolyte solution.

In order to improve charge/discharge characteristics and flame retardancy, the non-aqueous electrolyte solution may selectively further include an additive such as pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride. In some cases, halogen-containing solvents, such as carbon tetrachloride and ethylene trifluoride, may be further included in order to impart incombustibility, carbon dioxide gas may be further included in order to improve high-temperature storage characteristics, and fluoro-ethylene carbonate (FEC) or propenesultone (PRS) may be further included.

Calculating Electrolyte Solution Impregnation Rate (S3)

Next, in the method of preparing a lithium secondary battery of the present invention, an electrolyte solution impregnation rate may be calculated by using the prepared electrode material mixture layer.

In the method, after a non-aqueous electrolyte solution 15 is dispensed on a top surface of the electrode material mixture layer 13 (see FIG. 1), an electrolyte solution passing time is measured from a time immediately after the non-aqueous electrolyte solution is dispensed to a time immediately after the dispensed non-aqueous electrolyte solution passes through the electrode material mixture layer and is identifiable through a bottom surface, that is, a hole included in the perforated foil, and an electrolyte solution impregnation rate, i.e., an absorption (passing) rate, for an electrode composition having specific porosity may be calculated using the following Equation 1.

Impregnation rate (μm/sec)=electrode material mixture layer thickness (μm)/time (sec) from the time of dispensing the electrolyte solution to the time of reaching the bottom surface [Equation 1]

A method of measuring the electrolyte solution passing time may be simply performed by visual confirmation or measurement. Herein, the expression "visual confirmation or measurement" includes a meaning that an object is directly confirmed by observer's eyes or is indirectly confirmed through a medium between the object and the observer, for example, a lens, a camera, or a microscope.

The electrolyte solution is dispensed in an amount of 1 μL to 10 μL, for example, 1 μL to 5 μL. In a case in which the electrolyte solution is dispensed in an amount of less than 1 μL, it is difficult to observe the time when the electrolyte solution reaches, and, even if the amount is greater than 10 μL, an effect on the electrolyte solution impregnation rate due to the excessive amount of the dispensed electrolyte solution is insignificant.

Setting Estimated Electrolyte Solution Impregnation Time of Measurement Target Full Cell (S4)

Subsequently, in the method of the present invention, an estimated electrolyte solution impregnation time of a measurement target full cell may be set by using the electrolyte solution impregnation rate calculated using Equation 1.

That is, the estimated electrolyte solution impregnation time may be reflected in the adjustment of a production process of the battery according to the electrode composition and porosity with reference to the calculated electrolyte solution impregnation rate, i.e., absorption rate results. That is, in the present invention, the estimated electrolyte solution impregnation time required for the production process of the battery may be set and reflected according to the measurement result of the electrolyte solution impregnation rate, and, if necessary, an electrolyte solution injection process and an activation process may be further performed.

The setting of the estimated electrolyte solution impregnation time of the measurement target full cell may be performed by using the following Equation 2, after converting the calculated electrolyte solution impregnation rate to a rate with respect to time.

$$\text{Estimated full cell impregnation time (hr)} = \frac{0.0086(\text{mm}^{-2}) \times \text{electrode thickness } (\mu m) \times \frac{(\text{electrode area (mm}^2))}{2}}{\text{electrolyte solution impregnation rate } (\mu m/hr)} \quad \text{[Equation 2]}$$

In Equation 2, the estimated full cell impregnation time denotes the estimated electrolyte solution impregnation time of the full cell, and the electrode is a positive electrode or a negative electrode.

Specifically, since areas of the positive electrode and the negative electrode in the full cell are almost the same, the estimated full cell impregnation time may be calculated by setting the area of one electrode of the positive electrode and the negative electrode.

It is desirable to set the estimated full cell electrolyte solution impregnation time which is calculated for one electrode having a higher value of electrode thickness/electrolyte solution impregnation rate of the positive electrode and the negative electrode.

As described above, the method of preparing a lithium secondary battery according to the embodiment of the present invention may improve productivity and overall performance of the lithium secondary battery by reducing the failure rate by setting the estimated electrolyte solution impregnation time of the full cell and then reflecting the set time in an actual production line.

That is, after setting the estimated electrolyte solution impregnation time of the full cell as described above, the method of preparing a lithium secondary battery according to the embodiment of the present invention may further include the steps of:

preparing a secondary battery including the measurement target full cell (S5);

injecting the non-aqueous electrolyte solution into the secondary battery (S6); and performing an electrolyte solution impregnation process during the set estimated electrolyte solution impregnation time (S7).

Specifically, the 'full cell' is a unit cell composed of a unit structure of positive electrode/separator/negative electrode, wherein it is a cell in which a positive electrode and a negative electrode are disposed on both sides of the cell, respectively. The most basic structure of the full cell may include a structure composed of a positive electrode/separator/negative electrode cell and a positive electrode/separator/negative electrode/separator/positive electrode/separator/negative electrode cell.

In this case, in addition to the full cell, a 'bicell', as a structure in which the same electrode is disposed on both sides of the cell, for example, a unit structure of positive electrode/separator/negative electrode/separator/positive electrode and a unit structure of negative electrode/separator/positive electrode/separator/negative electrode, may be used.

Also, the electrode assembly of the present invention may be at least one of a jelly-roll type, stacked type, or stack and folding type electrode assembly, and, specifically, may be a stack and folding type electrode assembly which is prepared by sequentially overlapping a plurality of full cells having a predetermined unit size and then winding the cells.

The injecting of the electrolyte solution may be performed at room temperature.

As described above, in the present invention, an electrode material mixture layer is first prepared by using a conventional electrode active material slurry, and an electrolyte solution impregnation rate passing through the electrode material mixture layer may then be visually measured by dispensing the electrolyte solution. Also, before the preparation of the secondary battery, an optimum electrolyte solution impregnation time for the actual cell may be easily set by using the electrolyte solution impregnation rate measured by this method.

When the impregnation rate of the electrolyte solution is set as described above, since various measures taken in an aging process, for example, how long it takes for the degree of impregnation to be saturated or to what extent is an increase in the degree of impregnation according to time, may be quantitatively evaluated, or the failure rate may be minimized, a lithium secondary battery having improved productivity and performance may be effectively prepared.

Furthermore, in addition to the above-described steps, the method of preparing a lithium secondary battery according to the present invention may include a step of further performing an aging process or a formation process after sealing, after the performing of the impregnation process.

The formation process is a step of forming a solid electrolyte interface (SEI) on the surface of the negative electrode by partially performing charge and discharge to activate the battery, wherein the formation process is generally performed by repeating charge and discharge at a predetermined constant current or constant voltage.

Also, the aging process stabilizes the battery by allowing the activated battery as described above to be left standing for a certain period of time.

Furthermore, the method of preparing a lithium secondary battery according to the present invention may further include a step of degassing after the aging process, and gas, such as carbon dioxide and methane, generated during the formation of the SEI in the performing of the formation process as well as gas having the above-described components, which is generated in the performing of the high-temperature aging process to cause a swelling phenomenon of the battery later, may be removed in advance by the degassing.

The preparation method described above is not limited thereto, but, in some cases, a pre-step and a post-step may be selectively added or excluded to the above-described processes, or may be merged into one.

Also, in the present invention, a lithium secondary battery having excellent electrolyte solution impregnation ability, which is prepared by the above method, may be provided. The lithium secondary battery may include a lithium metal secondary battery, a lithium ion secondary battery, or a lithium polymer secondary battery.

Furthermore, the present invention provides a battery module in which stability is improved by connecting the plurality of lithium secondary batteries, which are prepared according to a typical method known in the art, in series or parallel.

Also, the present invention may provide a battery pack having improved safety which includes the battery module according to a typical method known in the art.

The battery pack having improved safety may be used as a power source of medium- and large-sized devices such as a power tool; an electric vehicle (EV) such as an electric car, a hybrid electric vehicle (HEV), and a plug-in hybrid electric vehicle (PHEV); an electric two-wheeled vehicle such as an E-bike or an E-scooter; an electric golf cart; an electric truck; and an electric commercial vehicle.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

Lithium cobalt composite oxide ($LiCoO_2$), carbon black, and PVDF were mixed in a weight ratio of 96:2:2, and N-methyl-2-pyrrolidone was added thereto to prepare a positive electrode active material slurry.

After the perforated 11 aluminum foil 10 having a thickness of 20 μm and a hole with a diameter of 0.1 mm was coated with the positive electrode active material slurry, the coated foil was dried at 100° C. in a vacuum oven for 12 hours, and a pressure of 50 MPa was then applied at 30° C. to prepare the positive electrode material mixture layer 13 having a thickness of 100 μm, a porosity of 20%, and a density of 3.75 g/cc.

Subsequently, a non-aqueous electrolyte solution was prepared in which ethylene carbonate (EC)/ethyl methyl carbonate (EMC)/polypropylene (PP) were mixed in a volume ratio of 20/20/60 (1 M $LiPF_6$), 10 μL of the non-aqueous electrolyte solution 15 was dispensed on a top surface of the positive electrode material mixture layer, and time from the time of dispensing until the time at which the non-aqueous electrolyte solution passed through the electrode material mixture layer and appeared on a bottom surface was measured (see FIG. 1).

An electrolyte solution impregnation rate was calculated from the measured time using the following Equation 1, and the results thereof are presented in Table 1 below.

Impregnation rate (μm/sec)=electrode material mixture layer thickness (μm)/time (sec) from the time of dispensing the electrolyte solution to the time of reaching the bottom surface  [Equation 1]

Example 2

An electrolyte solution impregnation rate was calculated in the same manner as in Example 1 except that a positive electrode material mixture layer having a thickness of 100 μm, a porosity of 20%, and a density of 3.9 g/cc was prepared on a perforated aluminum foil having a hole with a diameter of 0.01 mm, and the results thereof are presented in Table 1 below.

Example 3

An impregnation rate was calculated in the same manner as in Example 1 except that a positive electrode material mixture layer having a thickness of 100 µm, a porosity of 18%, and a density of 4.0 g/cc was prepared on a perforated aluminum foil having a hole with a diameter of 0.1 mm, and the results thereof are presented in Table 1 below.

Example 4

An impregnation rate was calculated in the same manner as in Example 1 except that a positive electrode material mixture layer having a thickness of 100 µm, a porosity of 20%, and a density of 3.75 g/cc was prepared on a perforated aluminum foil having a hole with a diameter of 1 mm, and the results thereof are presented in Table 1 below.

Example 5

An impregnation rate was calculated in the same manner as in Example 1 except that a positive electrode material mixture layer having a thickness of 100 µm, a porosity of 25%, and a density of 3.75 g/cc was prepared on perforated aluminum foil having a hole with a diameter of 0.1 mm, and the results thereof are presented in Table 1 below.

Example 6

An impregnation rate was calculated in the same manner as in Example 1 except that a positive electrode material mixture layer having a thickness of 200 µm, a porosity of 20%, and a density of 3.7 g/cc was prepared on a perforated aluminum foil having a hole with a diameter of 0.1 mm, and the results thereof are presented in Table 1 below.

Comparative Example 1

An impregnation rate was calculated in the same manner as in Example 1 except that an electrode material mixture layer having a thickness of 350 µm, a porosity of 20%, and a density of 23.2 g/cc was prepared on a perforated aluminum foil having a hole with a diameter of 0.1 mm, and the results thereof are presented in Table 1 below.

TABLE 1

| | Foil | | Electrode material mixture layer | | | Electrolyte solution (µL) | Electrolyte solution impregnation rate (µm/hr) |
|---|---|---|---|---|---|---|---|
| | Thickness (µm) | Hole (mm) | Thickness (µm) | Porosity (%) | Density (%) | | |
| Example 1 | 20 | 0.1 | 100 | 20 | 3.75 | 5 | 50 |
| Example 2 | 20 | 0.01 | 100 | 20 | 3.9 | 5 | 50 |
| Example 3 | 20 | 0.1 | 100 | 18 | 4.0 | 5 | 20 |
| Example 4 | 20 | 1 | 100 | 20 | 3.75 | 5 | 50 |
| Example 5 | 20 | 0.1 | 100 | 25 | 3.75 | 5 | 100 |
| Example 6 | 20 | 0.1 | 200 | 20 | 3.7 | 5 | 50 |
| Comparative Example 1 | 20 | 0.1 | 350 | 20 | 3.76 | 5 | 44 |

Referring to Table 1, as a result of measuring the electrolyte solution impregnation rates for the positive electrode material mixture layers of Examples 1, 2, and 4 to 6, it was confirmed that, in a case in which the porosity was 20 vol % or more, the electrolyte solution impregnation rates were at good levels, an average of about 50 µm/hr or more. However, in a case in which the porosity was low as in Example 3, it may be confirmed that the electrolyte solution impregnation rate was rapidly reduced. Based on these results, in a case in which the porosity of the electrode was low during the preparation of the secondary battery, there is a need to change the electrolyte solution impregnation time or the impregnation process.

In a case in which the thickness of the electrode material mixture layer was greater than 200 µm even if the porosity of the positive electrode material mixture layer was included within the range of the present invention as in Comparative Example 1, since there was a difference between the thickness of the electrode material mixture layer and a substantial electrode thickness, it may be confirmed that reliability of impregnation evaluation results was low.

Accordingly, it may be confirmed that the thickness and porosity of the electrode material mixture layer acted as main factors when the electrolyte solution impregnation rate was measured. Based on such results, a proper impregnation time was set to reduce unnecessary impregnation process time or increase the impregnation time during the preparation of the secondary battery, and thus, performance and stability may be improved.

EXPERIMENTAL EXAMPLES

Reference Example

Standard Electrode Preparation

Lithium cobalt composite oxide (LiCoO$_2$), carbon black, and PVDF were mixed in a weight ratio of 96:2:2, and N-methyl-2-pyrrolidone was added thereto to prepare a positive electrode active material slurry.

A positive electrode collector was then coated with the positive electrode active material slurry and rolled to prepare a positive electrode having an area of 61×77 mm$^2$, a thickness of 58 µm, a porosity of 23.4%, and a density of 3.75 g/cc.

Natural graphite as a negative electrode active material, PVDF as a binder, and carbon black, as a conductive agent, were mixed in a weight ratio of 95:2:3 to prepare a negative electrode active material slurry. A negative electrode collector (copper (Cu) thin film) was coated with the negative electrode active material slurry, dried, and roll-pressed to prepare a negative electrode having a thickness of 62 µm.

Subsequently, ethylene carbonate (EC), propylene carbonate (PC), and ethyl methyl carbonate (EMC) were mixed in a volume ratio of 20:10:70, and 1 M LiPF$_6$ was then dissolved to prepare a non-aqueous electrolyte solution.

The prepared positive electrode, a polyethylene porous film and the negative electrode were sequentially stacked to prepare an electrode assembly, and a lithium secondary battery including a full cell used as a standard electrode was prepared by performing an impregnation process using a method of vacuuming after injecting the electrolyte solution at room temperature. In this case, the impregnation process was performed for about 24 hours, as standard time of a secondary battery including a full cell having an area of 61×77 mm$^2$.

After the completion of the injection, the cell was fully charged to a voltage of 4.4 V over time under constant current-constant voltage (CC-CV) conditions, the lithium secondary battery was then disassembled, and it was confirmed that the negative electrode (surface of the copper current collector) changed to golden color. Thus, in a case in which the color of the negative electrode changed, it may be considered that the electrolyte solution impregnation was good.

Example 7

(Step 1: Electrode Assembly Preparation)

An aluminum current collector was coated with the positive electrode active material slurry used in the preparation of the electrode material mixture layer of Example 1 and rolled to prepare a positive electrode having an area of 61×77 mm$^2$, a thickness of 50 μm, a porosity of 20%, and a density of 3.95 g/cc.

Next, natural graphite as a negative electrode active material, PVDF as a binder, and carbon black, as a conductive agent, were mixed in a weight ratio of 95:2:3 to prepare a negative electrode active material slurry. A negative electrode collector (Cu thin film) was coated with the negative electrode active material slurry, dried, and roll-pressed to prepare a negative electrode having a thickness of 54 μm and a porosity of 24.3%.

The prepared positive electrode, a polyethylene porous film and the negative electrode were sequentially stacked to prepare an electrode assembly.

(Step 2: Electrolyte Solution Impregnation Time Set)

The electrolyte solution impregnation rate (50 μm/hr) calculated in Example 1 was applied to the following Equation 2 to set an estimated electrolyte solution impregnation time (20 hrs) of a measurement target full cell.

$$\text{Estimated full cell impregnation time (hr)} = \frac{0.0086(\text{mm}^{-2}) \times \text{electrode thickness (μm)} \times \frac{(\text{electrode area (mm}^2))}{2}}{\text{electrolyte solution impregnation rate (μm/hr)}}$$ [Equation 2]

In Equation 2, the estimated full cell impregnation time denotes the estimated electrolyte solution impregnation time of the full cell, and the electrode is the positive electrode.

(Step 3: Secondary Battery Preparation)

Ethylene carbonate (EC), propylene carbonate (PC), and ethyl methyl carbonate (EMC) were mixed in a volume ratio of 20:10:70, and 1 M LiPF$_6$ was then dissolved to prepare a non-aqueous electrolyte solution.

The electrode assembly prepared in step 1 was accommodated in a battery case, and a lithium secondary battery of the present invention was prepared by performing an impregnation process for 20 hours, which was set in step 2, under vacuum conditions, after injecting the non-aqueous electrolyte solution at room temperature.

After the completion of the injection, the cell was fully charged to a voltage of 4.4 V over time under constant current-constant voltage (CC-CV) conditions, the lithium secondary battery was then disassembled, and it was confirmed that the negative electrode changed to golden color (in this case, since the electrolyte solution impregnation evaluation was performed every 6 hours, actual impregnation time was considered as 24 hours). The evaluation results are presented in Table 2 below.

Example 8

(Step 1: Electrode Assembly Preparation)

An aluminum current collector was coated with the positive electrode active material slurry used in the preparation of the electrode material mixture layer of Example 3 and rolled to prepare a positive electrode having an area of 61×77 mm$^2$, a thickness of 47 μm, a porosity of 18%, and a density of 4.0 g/cc.

Next, natural graphite as a negative electrode active material, PVDF as a binder, and carbon black, as a conductive agent, were mixed in a weight ratio of 95:2:3 to prepare a negative electrode active material slurry. A negative electrode collector (Cu thin film) was coated with the negative electrode active material slurry, dried, and roll-pressed to prepare a negative electrode having a thickness of 54 μm and a porosity of 24.3%.

The prepared positive electrode, a polyethylene porous film and the negative electrode were sequentially stacked to prepare an electrode assembly.

(Step 2: Electrolyte Solution Impregnation Time Set)

The electrolyte solution impregnation rate (20 μm/sec) calculated in Example 3 was applied to Equation 2 to set an estimated electrolyte solution impregnation time (about 47 hrs) of a measurement target full cell.

(Step 3: Secondary Battery Preparation)

Ethylene carbonate (EC), propylene carbonate (PC), and ethyl methyl carbonate (EMC) were mixed in a volume ratio of 20:10:70, and 1 M LiPF$_6$ was then dissolved to prepare a non-aqueous electrolyte solution.

Subsequently, the electrode assembly prepared in step 1 was accommodated in a battery case, and a lithium secondary battery of the present invention was prepared by performing an impregnation process for 47 hours, which was set in step 2, under vacuum conditions, after injecting the non-aqueous electrolyte solution at room temperature.

After the completion of the injection, the cell was fully charged to a voltage of 4.4 V over time under constant current-constant voltage (CC-CV) conditions, the lithium secondary battery was then disassembled, and it was confirmed that the negative electrode changed to golden color (in this case, since the impregnation evaluation was performed every 6 hours, actual impregnation time was considered as 48 hours). The evaluation results are presented in Table 2 below.

Comparative Example 2

The electrode assembly was accommodated in the battery case in the secondary battery preparation step (step 3) of Example 8, and a lithium secondary battery was then prepared by performing an impregnation process for 24 hours, as the impregnation time of the standard electrode, under vacuum conditions, after injecting the non-aqueous electrolyte solution at room temperature.

After the completion of the injection, the cell was fully charged to a voltage of 4.4 V over time under constant current-constant voltage (CC-CV) conditions, the lithium secondary battery was then disassembled, and the change of the negative electrode was confirmed. As a result of confirmation, the negative electrode remained black. The evaluation results are presented in Table 2 below.

TABLE 2

| | Example 7 | Example 8 | Comparative Example 2 |
|---|---|---|---|
| Electrode porosity (%) | 20 | 18 | 18 |
| Electrolyte solution impregnation rate (μm/hr) | 50 | 20 | 20 |
| Estimated full cell impregnation time (hr) | 20 | 47 | 47 |
| Actual impregnation time (hr) | 24 | 48 | 24 |
| Comparison result with standard electrode | ○ | ○ | X |

○: good,
X: poor

As described above, electrolyte solution impregnability may be evaluated by comparing a degree of change of the negative electrode of the secondary battery after the completion of the impregnation process. That is, in a case in which the negative electrode changed to golden color in comparison to the standard electrode having a good degree of impregnation, the degree of impregnation was good, and, in a case in which the negative electrode remained purple or black, it was evaluated as poor.

Referring to Table 1, with respect to the secondary batteries of Examples 7 and 8 to which the estimated electrolyte solution impregnation times set by the method of the present invention were applied, it may be understood that the degree of impregnation was good.

In contrast, with respect to the secondary battery of Comparative Examples 2 to which the standard impregnation time (24 hours) was applied instead of the estimated electrolyte solution impregnation time set by the method of the present invention, it may be understood that the degree of impregnation of the electrolyte solution was poor.

Thus, in the method of the present invention, processing time and costs may not only be reduced, but the failure rate may also be minimized by first preparing an electrode material mixture layer to calculate an electrolyte solution impregnation rate, setting an optimum estimated electrolyte solution impregnation time of the electrolyte solution for the electrode based on a measured result, and reflecting it in a production process, and, as a result, it is predicted that productivity and performance of the secondary battery may be improved.

The invention claimed is:

1. A method of preparing a lithium secondary battery, the method comprising steps of:
forming an electrode material mixture layer having a thickness of 10 μm to 200 μm, a porosity of 18 vol % to 30 vol %, and a density of 1 g/cc to 4.5 g/cc by coating a perforated foil with an electrode active material slurry and rolling the coated foil (S1);
preparing a non-aqueous electrolyte solution (S2);
calculating an electrolyte solution impregnation rate by measuring a time at which the non-aqueous electrolyte solution passes through the electrode material mixture layer (S3);
setting an estimated electrolyte solution impregnation time of a measurement target full cell by using the electrolyte solution impregnation rate (S4); and
performing an electrolyte solution impregnation process during the set estimated electrolyte solution impregnation time of the full cell (S7).

2. The method of claim 1, wherein the perforated foil is formed of a material selected from the group consisting of copper, aluminum, iron, tin, titanium, nickel, lead, zinc, silver, gold, stainless steel, and a combination thereof.

3. The method of claim 1, wherein a hole diameter of the perforated metal foil is in a range of 0.1 μm to 1 mm.

4. The method of claim 1, wherein a hole diameter of the perforated metal foil is in a range of 10 μm to 1 mm.

5. The method of claim 1, wherein the electrode active material slurry comprises an electrode active material; a solvent; and at least one additive of a binder, a conductive agent, and a filler.

6. The method of claim 5, wherein the electrode active material is a negative electrode active material or a positive electrode active material.

7. The method of claim 6, wherein, in a case in which the electrode active material slurry comprises the negative electrode active material,
the electrode material mixture layer has a porosity of 20 vol % to 30 vol % and a density of 1.3 g/cc to 1.8 g/cc.

8. The method of claim 6, wherein, in a case in which the electrode active material slurry comprises the positive electrode active material,
the electrode material mixture layer has a porosity of 18 vol % to 30 vol % and a density of 3.4 g/cc to 4.2 g/cc.

9. The method of claim 1, wherein the electrode active material slurry is pressure-molded at a pressure of 10 MPa to 100 MPa in a temperature range of 0° C. to 120° C.

10. The method of claim 1, wherein the step S3 of calculating the electrolyte solution impregnation rate comprises:
dispensing 1 μL to 10 μL of the non-aqueous electrolyte solution on a top surface of the electrode material mixture layer, and
calculating the electrolyte solution impregnation rate by measuring an electrolyte solution passing time from a time of dispensing the non-aqueous electrolyte solution until a time at which the dispensed non-aqueous electrolyte solution passes through the electrode material mixture layer and appears on a bottom surface.

11. The method of claim 10, wherein a method of measuring the electrolyte solution passing time is performed by visual confirmation or is performed by indirect confirmation through a medium between an object and an observer.

12. The method of claim 1, wherein the electrolyte solution impregnation rate is calculated using Equation 1:

impregnation rate (μm/sec)=electrode material mixture layer thickness (μm)/time (sec) from a time of dispensing the electrolyte solution to a time of reaching a bottom surface.  [Equation 1]

13. The method of claim 1, wherein the estimated electrolyte solution impregnation time of the measurement target full cell is set by using Equation 2:

$$\text{estimated full cell impregnation time (hr)} = \frac{0.0086(\text{mm}^{-2}) \times \text{electrode thickness } (\mu m) \times \frac{(\text{electrode area } (\text{mm}^2))}{2}}{\text{electrolyte solution impregnation rate } (\mu m/\text{hr})} \quad \text{[Equation 2]}$$

wherein, in Equation 2, the estimated full cell impregnation time denotes the estimated electrolyte solution impregnation time of the full cell, and the electrode is a positive electrode or a negative electrode.

14. The method of claim 1, wherein, between the steps of setting the estimated electrolyte solution impregnation time and performing the electrolyte solution impregnation process, the method further comprises steps of:

preparing a secondary battery including the measurement target full cell (S5); and injecting the non-aqueous electrolyte solution into the secondary battery (S6).

* * * * *